United States Patent
Pierre et al.

(10) Patent No.: US 7,536,704 B2
(45) Date of Patent: May 19, 2009

(54) METHOD AND APPARATUS AUTOMATIC PAUSE AND RESUME OF PLAYBACK FOR A POPUP ON INTERACTIVE TV

(75) Inventors: Ludovic Pierre, San Francisco, CA (US); Janice Mead, Cupertino, CA (US)

(73) Assignee: OpenTV, Inc., San Francisco, CA (US)

( * ) Notice: Subject to any disclaimer, the term of this patent is extended or adjusted under 35 U.S.C. 154(b) by 1743 days.

(21) Appl. No.: 09/972,821

(22) Filed: Oct. 5, 2001

(65) Prior Publication Data

US 2003/0070182 A1    Apr. 10, 2003

(51) Int. Cl.
*H04N 5/455*    (2006.01)
(52) U.S. Cl. .......................... 725/58; 725/89; 725/100; 725/134; 386/68; 455/404.1
(58) Field of Classification Search .................. 725/58, 725/89, 100, 134, 135, 142; 386/68–70; 455/404.1, 466
See application file for complete search history.

(56) References Cited

U.S. PATENT DOCUMENTS

| | | | |
|---|---|---|---|
| 5,650,776 A * | 7/1997 | Mitchell et al. ............. 340/7.39 |
| 5,692,213 A * | 11/1997 | Goldberg et al. .......... 715/500.1 |
| 5,708,845 A | 1/1998 | Wistendahl et al. |
| 5,870,562 A | 2/1999 | Butman et al. |
| 5,898,838 A | 4/1999 | Wagner |
| 6,002,393 A | 12/1999 | Hite et al. |
| 6,128,653 A | 10/2000 | del Val et al. |
| 6,131,163 A | 10/2000 | Wiegel |
| 6,141,058 A | 10/2000 | Lagoni et al. |
| 6,339,832 B1 | 1/2002 | Bowman-Amuah |
| 6,385,647 B1 | 5/2002 | Willis et al. |
| 6,385,693 B1 | 5/2002 | Gerszberg et al. |
| 6,459,427 B1 | 10/2002 | Mao et al. |
| 6,484,199 B2 | 11/2002 | Eyal |
| 6,487,277 B2 * | 11/2002 | Beyda et al. ............. 379/88.01 |
| 6,738,742 B2 * | 5/2004 | Badt et al. .................. 704/270 |
| 7,164,678 B2 * | 1/2007 | Connor ....................... 370/392 |
| 7,260,610 B2 * | 8/2007 | Grooters et al. ............ 709/207 |
| 2002/0032907 A1 * | 3/2002 | Daniels ....................... 725/51 |
| 2006/0179415 A1 * | 8/2006 | Cadiz et al. ................. 715/838 |

FOREIGN PATENT DOCUMENTS

| | | | |
|---|---|---|---|
| WO | WO 01/95694 | * | 12/2001 |
| WO | WO 200195694 A2 | * | 12/2001 |
| WO | WO 00/64153 | | 10/2003 |

OTHER PUBLICATIONS

International Search Report, International Application No. PCT/US 02/31505, International Filing Date Oct. 3, 2002.

* cited by examiner

*Primary Examiner*—Annan Q Shang
(74) *Attorney, Agent, or Firm*—Rory D. Rankin; Meyertons Hood Kivlin Kowert & Goetzel, P.C.

(57) ABSTRACT

A method and apparatus providing display of content and automatic pause of the display. The method and apparatus exists in a client device and/or ahead-end or network operator. Event are assigned a relative priority based on event type, originator and the type of current display so that a variable response level ranging from a required viewer action to the viewer completely ignoring an event is provided.

20 Claims, 4 Drawing Sheets

METHOD AND APPARATUS AUTOMATIC PAUSE AND RESUME OF PLAYBACK FOR A POPUP ON INTERACTIVE TV

CROSS REFERENCE TO RELATED APPLICATIONS

This patent application is related to U.S. patent application Ser. No. 09/858,436 filed on May 16, 2001, entitled "A Service Gateway for Interactive Television" which is hereby incorporated by reference in its entirety.

BACKGROUND OF THE INVENTION

1. Field of the Invention

The present invention relates generally to interactive television systems, and more particularly, to providing an automatic pause and possibly recording of broadcasts during servicing of specified event types and resuming playback of the broadcast after acknowledging the event.

2. Summary of the Related Art

Interactive television systems are capable of displaying text and graphic images in addition to typical video program streams and provide a number of services and interactive applications to viewers. Generally, a broadcast service provider generates an interactive television signal for transmission to a viewer's television. The interactive television signal includes an interactive portion consisting of application code or system information, as well as an audio-video portion consisting of a television program. The broadcast service provider combines the audio-video and interactive portions into a single signal for transmission to a receiver connected to the viewer's television. The signal is generally compressed prior to transmission and transmitted through typical broadcast channels, such as cable television (CATV) lines or direct satellite transmission systems.

A set top box connected to the television controls the interactive functionality of the television. The set top box receives the signal transmitted by the broadcast service provider, separates the interactive portion from the audio-video portion, and decompresses the respective portions of the signal. The set top box uses the interactive information to execute an application while the audio-video information (after processing) is transmitted to the television, for example. The set top box may combine the audio-video information with interactive graphics or audio generated by the interactive application prior to transmitting the information to the television. The interactive graphics and audio may present additional information to the viewer or may prompt the viewer for input. The set top box may provide viewer input or other information to the broadcast service provider via a modem connection.

The video, audio, and system information may be sent from a head end in various blocks of data via various transport mediums. For example, they may be sent from the head end via cable or satellite to the set top box. An example of the contents of such system information includes information regarding present or future events, services that the user of the set top box may access, and the current time and date. Examples of events include a television program (e.g., news, movie, sports), while an example of services includes a set of channels broadcast by the network (head end). Information on events is contained within an Event Information Table (EIT). This information is typically transferred from the head end to the set top box in EIT sections. These EIT tables are continuously re-broadcast by the head end due to the fact that the head end does not know when a set-top box is powered on.

The interactive television environment is rich and diverse in content and sources of content. A variety of inputs are available from a variety of sources, including email, voice mail, alternative broadcasting and numerous other devices. Presently there is no known method of adequately servicing these inputs during live broadcast of a show or playback of a recorded show without either missing a portion of the show. For example, an important phone call may go unanswered while a viewer watches a three hour soccer match. Thus, there is a need for a method and apparatus that handles incoming events during live broadcasts on interactive television.

The above is a brief description of some deficiencies in the prior art and advantages of the present invention. Other features, advantages, and embodiments of the invention will be apparent to those skilled in the art from the following description, drawings, and claims.

SUMMARY OF THE INVENTION

The present invention relates primarily to the use of a set top box that automatically pauses a playback when a popup program is launched and resumes playback when the popup has exited. The present invention provides a method and apparatus for automatically pausing a video on demand program, or either a live or prerecorded broadcast of an interactive television program, or an application running on a set top box associated with the interactive television, to notify a viewer of an incoming event. The paused broadcast is recorded during the pause and is available for playback after the pause when the viewer returns from servicing or acknowledging the incoming message or event. Incoming events are assigned event identification codes and an associated priority. The present invention issues a non-obtrusive event notification during live programming for lesser priority events and interrupts playback for higher priority events. Playback of live broadcast is at variable speed so that slow motion, freeze frame and accelerated playback are available. Accelerated playback may be automatically engaged so that the playback eventually catches up to the live broadcast and recorded playback is terminated.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the present invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
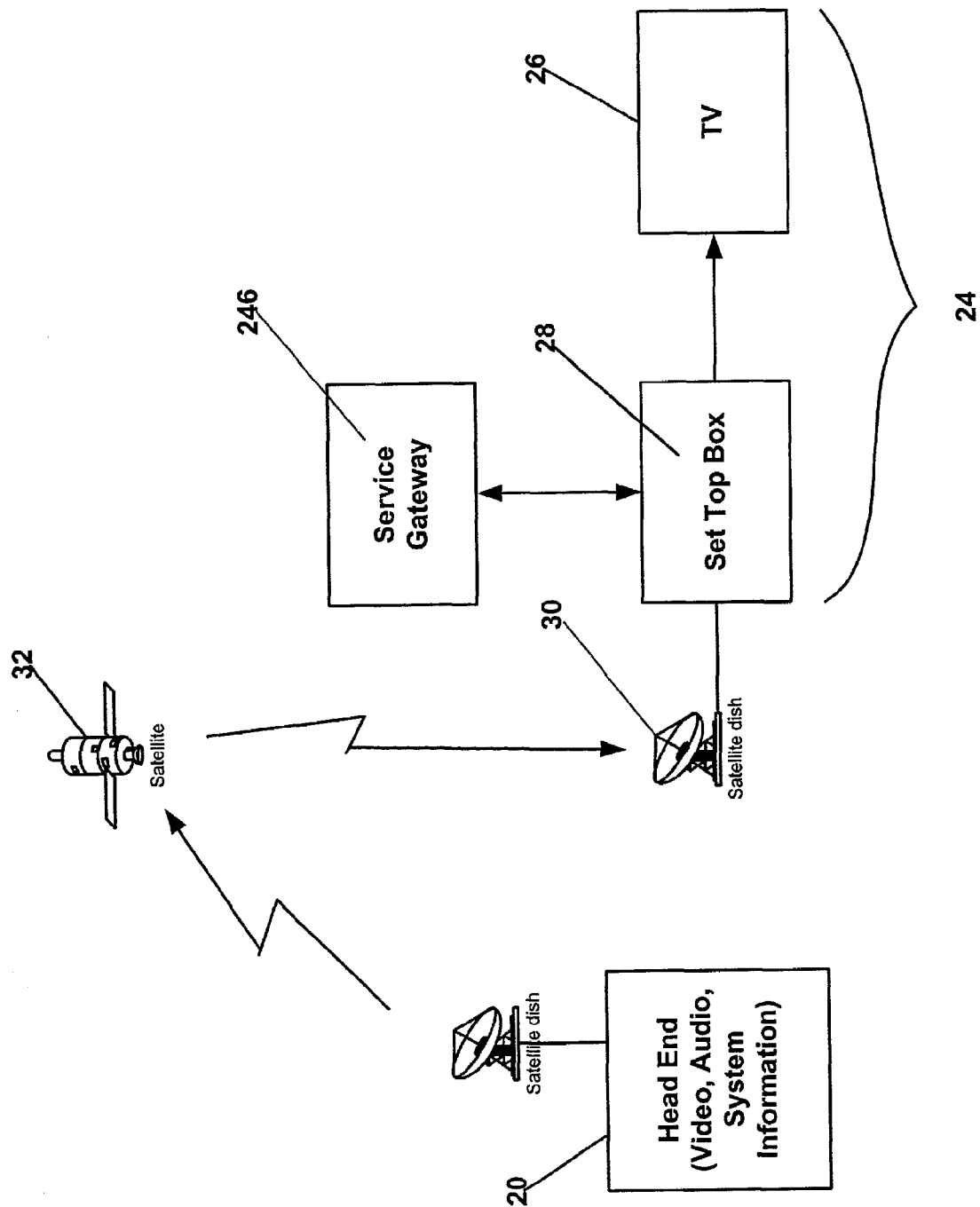
FIG. 1 is a diagram illustrating the distribution of interactive television applications, television programs, and system information from a source to a receiving station.

Turning now to FIG. 1, FIG. 1 is a diagram illustrating the distribution of interactive television applications, television programs (audio and video) and system information (e.g., number of services, service names, event names, event schedules) from a source to a viewer. The system includes a head end 20, which may be coupled with a video and audio device (not shown) that feeds a particular video with associated audio to the head end. The audio-video-interactive signal contains television programs or similar audio-video content, as well as interactive content such as control signals, system information, and interactive applications. The video information may be digitized at the head end 20 and transmitted via a transmitter to a receiving system 24. The information transmitted by the head end 20 may be transmitted to the receiving system 24 in various ways. For example, the transmitted information may be sent to the receiving system 24 via a broadcast signal such as a satellite transmission. The receiving station 24 may also be configured to receive signals via a modem channel, cable or terrestrial air waves. The receiving system 24 may include, for example, a television 26 connected to a set top box 28. If satellite transmission is used, the set top box 28 may include a receiving antenna 30 for receiving information from a satellite 32. The receiving station antenna 30 passes the interactive television signal to the set top box 28, which performs the processing functions of the receiving station 24. Once information is received through the receiving antenna 30, it may be processed by the set top box 28 and displayed on the television set 26. In this manner, audio, video, and interactive data may be received and processed by the set top box 28. The signals transmitted via the broadcast or modem channels may embody various modules which comprise components of an interactive application. The modules may contain any type of data, such as application code, raw data, or graphical information.

System information provided to the set top box 28 also includes a list of services (e.g., CNN, MTV, ESPN) available to a viewer, event names (e.g., Dateline, Star Trek), and a schedule of the events (start time/date and duration). The service gateway 246 provides a communication link between the STB and service platform 50 as shown in FIG. 2.

Figure 2:
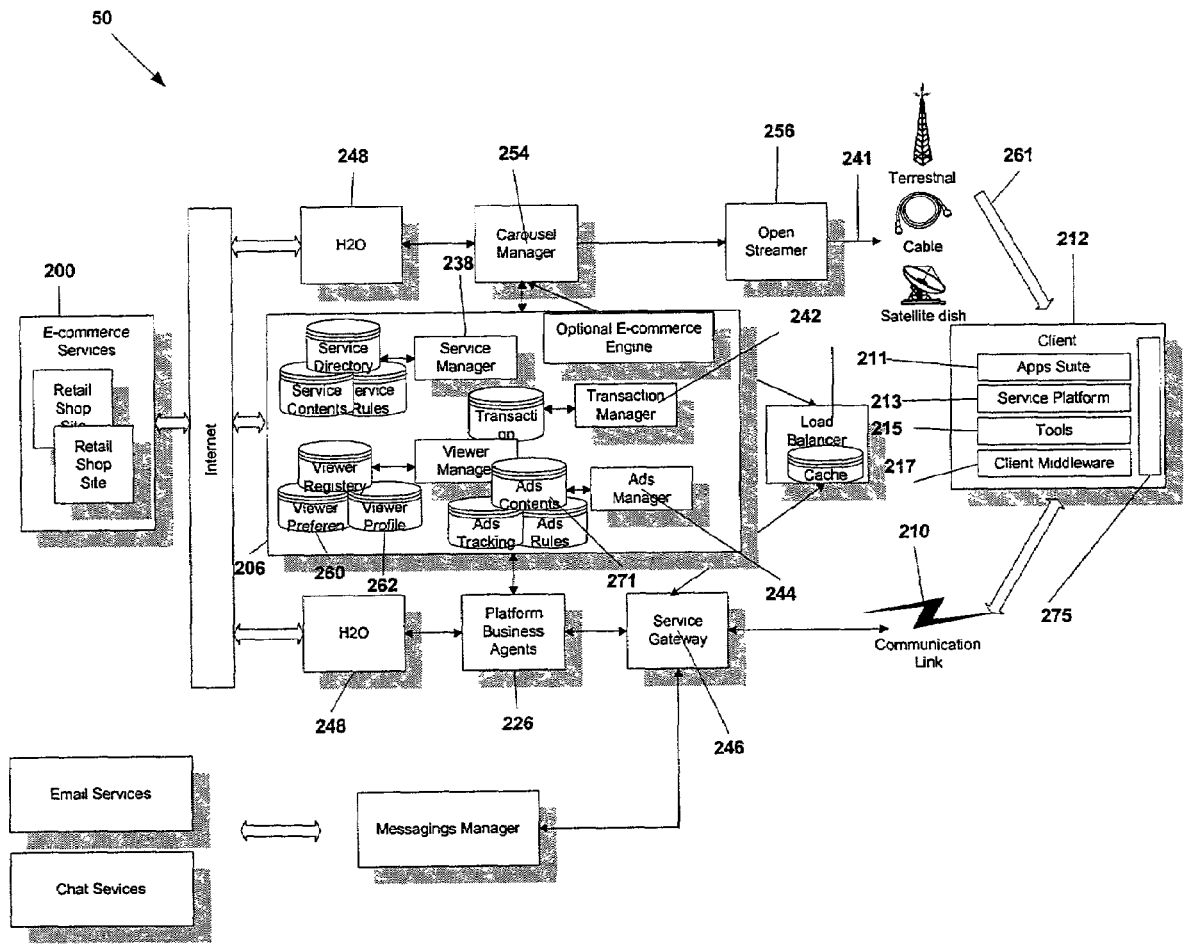
FIG. 2 is a diagram of a Service Platform environment in which the present invention operates.

Turning now to FIG. 2, the Service Platform (SP) in which the present invention resides is presented. The present invention may alternatively reside in the STB. The SP 50 enables services 200 to interact with a client 212. The services 200 communicate through a communication link 265 to the SP 50. The SP 50 in turn communicates with a client 212. The client 212 may be a STB, a digital assistant, a cellular phone, or any other communication device capable of communicating with the SP through communication link 210.

FIG. 2 illustrates an example of a preferred implementation of Service Platform 50. Services 200 provide shopping, chat, and other services either over the Internet or over another network or communication channel accessible to the network operator. Using the SP, the network operator accesses those services. Business functions 206, comprising service manager 238, interact with carousel manager 254 to retrieve content from a service 200. The carousel comprises a repeating stream of audio/video/interactive data broadcast to clients from the SP 50. Carousel manager 254, transaction manager 242 and service manager 238 control the content insertion and deletion from the broadcast carousel. Service content is retrieved and converted into a SP suitable format by H2O 248. H2O 248 is a possible implementation of content conversion. H2O converts HTML content into SP/client readable content. The converted content is formatted into a data carousel and multiplexed by the Open Streamer 256 for broadcast to the client 212. Client 212 interacts with the services and if necessary communicates with the SP and the services 200. PTP communication goes through SGW 246. SGW 246 performs transport conversion to convert the STB DATP protocol into a standard communication protocol which the Platform Business Agents 226 and H2O 248 understand. Client 212 and Service 200 interact via Point-to-Point link 210. The service 200 comprises shopping, audio/video, gaming, voting, advertisement, messaging, or any other service. Interactive applications are also transmitted from the SP to the STB. User interactive inputs, to interactive programs running on the SP, are transmitted via communication link 210.

Viewer Manager 240 stores client/user information and viewer interruption scenarios (pause and playback) in User Data 220. Platform Business Agents 226 control the flow of viewer information to the Service 200. Transaction Manager 242 records transactional information exchanged between the service 200 and Client 212. Based on the Business Rules 222 and the User Data 220, Advertising Manager 244 determines which advertisements and which type of advertisements will be presented to the client via Broadcast 234 link 241 and Point-to-Point 232 link 210. The Service Platform Transaction Manager records all transactions, including interruption, pause and playback scenarios in the Transaction and subscriber profiles in Viewer Profile 162 and Viewer Category 160 (viewer buying and viewing habits). The SP gathers the viewer habits, for example, interruption scenarios or how a viewer reacts to an interruption, for statistical purposes and stores them in the User Data 220. The SP enables the broadcaster to determine interruption policies depending on the users interruption scenarios and the program being broadcast or replayed. The STB sends a message to the SP indicating that a particular program is being replayed to invoke the same rules of interruption that were in effect when the program was originally broadcast. An email alert or other message or trigger is sent from the STB to the SP through the SGW, for example, upon pause of the playback, to retrieve the body of the email and then pause the playback to the user at the STB. For example, after a stock broker alert, a decision to buy/sell results in a connection of the STB to the SP through the SGW 246 to executer the order.

Figure 3:
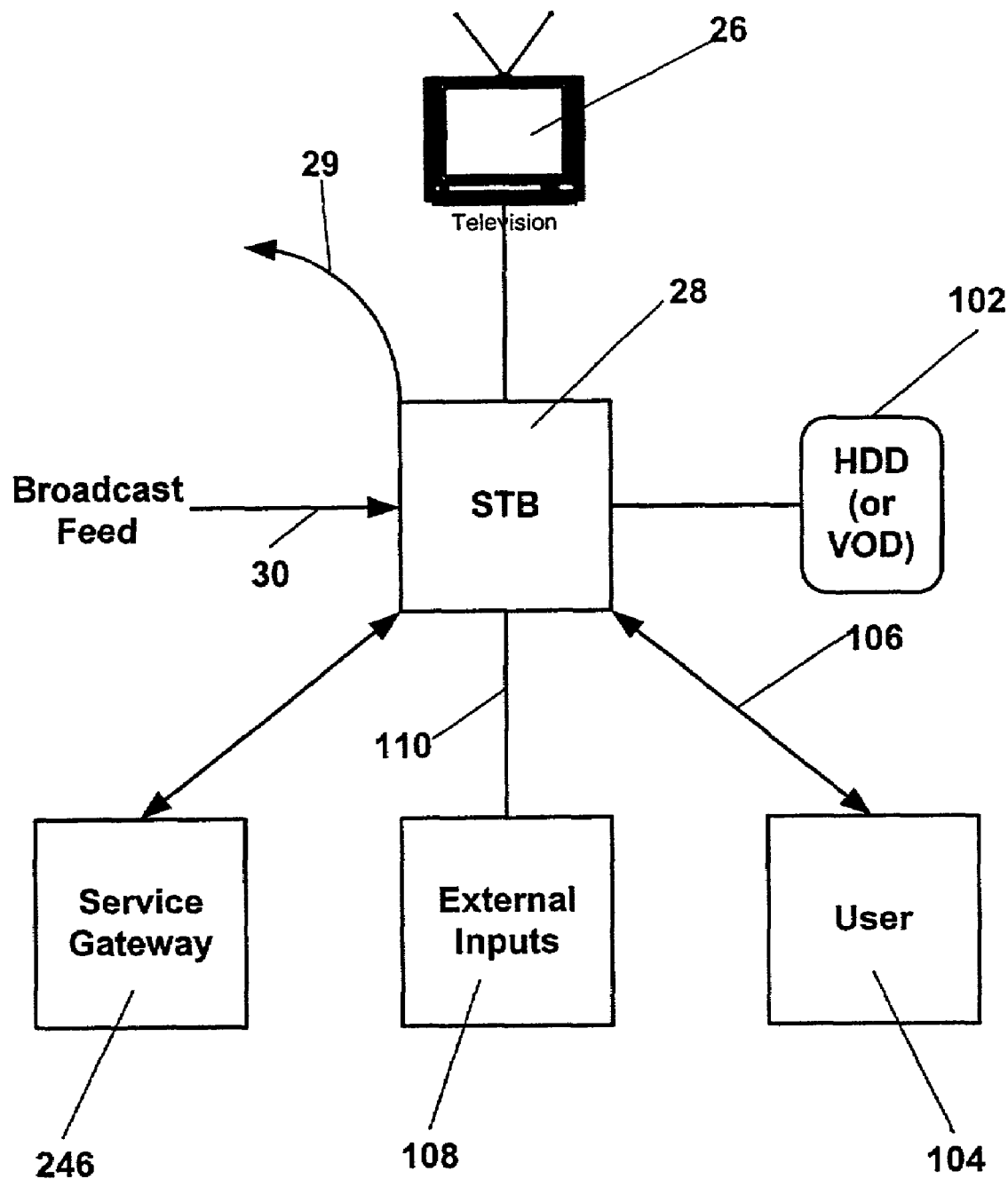
FIG. 3 is a diagram illustrating the present invention within a set top box.

Turning now to FIG. 3, a broadcast feed 30 provides live programming, prerecorded events and head-end generated or inserted special event notifications to the set top box 28. The Service Gateway, discussed above provides additional inputs to the STB. A hard disk storage device 102 is connected to the set top box to store data acquired from incoming broadcast feed 30 for playback. A user 104 viewing or listening to the television 26 can communicate with the set top box 28 via viewer interface 106. Viewer interface 106 is preferably a wireless remote control with suitable viewer response buttons, suitable for making an appropriate response to an event notification, as discussed below.

External inputs 108 communicate with the set top box via external input interface 110. External inputs 108 comprise programmable signals from devices or other viewers, other than the local viewer, user 104. These external inputs comprise signals from such household devices as phone, oven timers, baby monitors, doorbells, burglar alarms, appliances or other computers connected via networks or carriers or additional head end feeds. The present invention resides in the set top box or other user device where it receives and processes the programming and applications from the broadcast feed 30, user input via viewer interface 106 from viewer/user 104 and external inputs 108 via interface 110.

Figure 4:
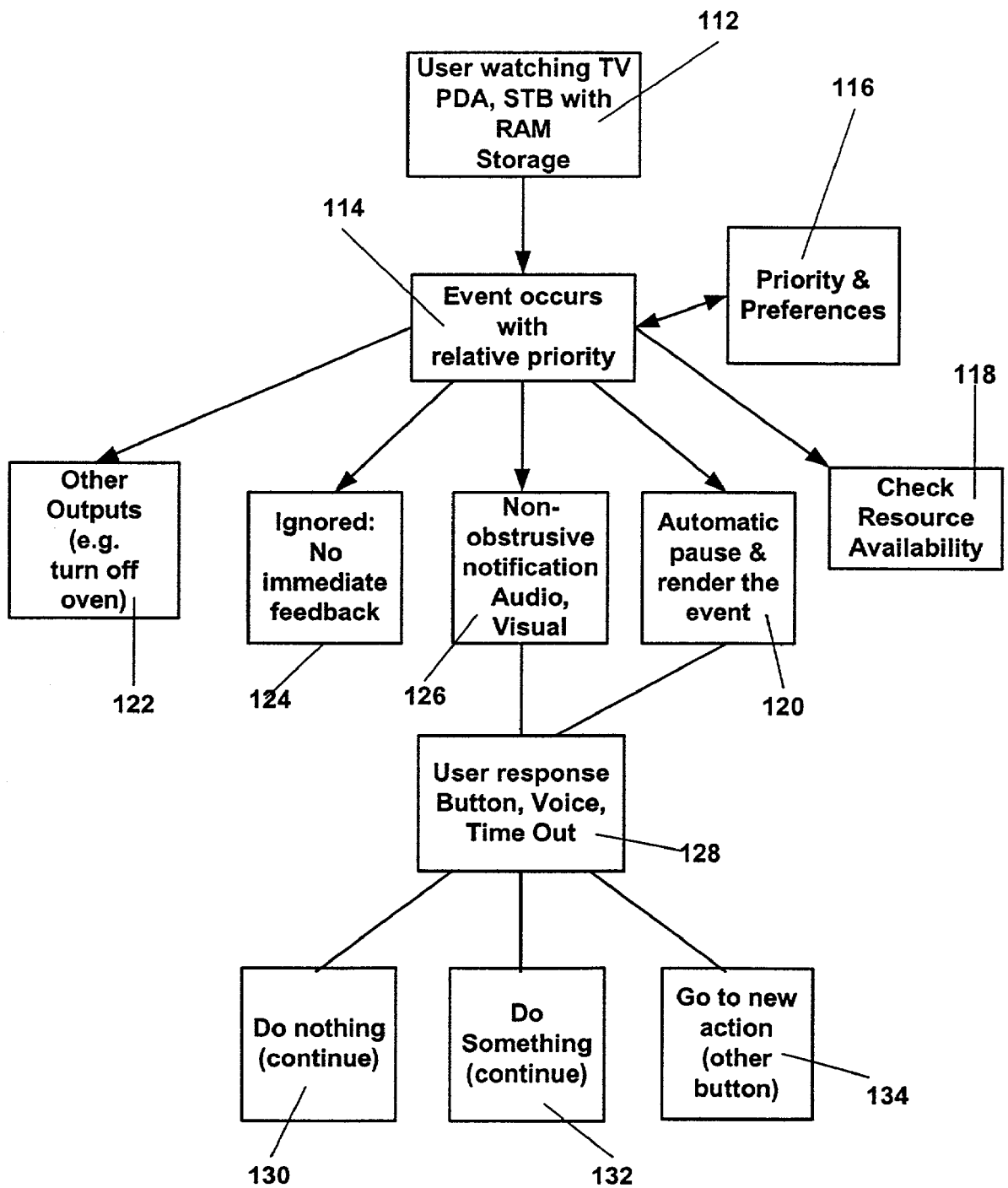
FIG. 4 is an illustration of the processing that takes place in a preferred embodiment of the present invention.

The pause command from the user STB also pauses an interactive running on SP or STB. Pausing an interactive application comprises sending a message or signal to the application to tell the application to pause and then sending and then sending another message or signal telling the application to resume. As shown in FIG. 4, the incoming event launches a popup application and is processed according to the present invention. The present invention processes incoming events preferably with a user watching 112 an interactive audio and/or video data stream at a television (TV) with a set top box having a processor and data storage 275 or at a personal data assistant (PDA) having a processor and data storage. The user device in which the present invention operates and resides can also be a cell phone or other electronic device. The present invention may also run as a head-end application. During a playback or broadcast of a program, whether or not the viewer is watching, the present invention sends an event notification to the user device, preferably a STB with which the viewer is associated.

The event notification includes an event identification code defining the type of event and a relative priority. The event can be an incoming email, a reminder for an upcoming show on TV, a phone call, or an appliance timer such as an oven timer. The priority can be assigned by the user or the head end operator or the entity originating the event. In a preferred embodiment, the incoming event is identified as to type, for example, email, phone call, reminder, etc. and assigned a priority based on the event type, the current viewing activity and the user's preferences regarding incoming messages and viewing rules. A viewer may decide to hold all calls during viewing of Seinfeld reruns. Thus, incoming events, that is, phone calls, emails, reminders, etc. are handled differently depending on who is calling and the assignment of priority to a call from that particular caller. Different callers may be assigned different priorities and handled differently depending on what program or application with which the viewer is currently engaged or is on the screen when the view is not watching.

For example, event priority is compared to a table of viewer priority and preferences 116 to determine what actions are appropriate for the event. The viewer priority and preference table 116 comprises event types, event originators, viewer interruption rules and relative priorities. Appropriate responses to incoming events are determined by looking at the event type (email, phone call, etc.) and event source (stockbroker, friend, boss, mom) to determine a relative priority or by looking for an event type and priority previously programmed and stored in a priority table. The priority assignment decision further comprises consideration of interruption rules. Interruption rules determine whether the current message type and originator warrant interruption of the current program. In an alternative embodiment, the present invention further comprises a neural network. Appropriate responses to incoming events can be learned by a trained neural network provided by the present invention and executed by the present invention depending on what programming is currently being displayed at the STB, PDA or other user device. For, example, an incoming phone call from an unidentified number may be ignored, while a call from the viewer's mother causes a notification to be sent to the viewer and may even pause viewing or application running on the TV, to answer the call, depending on what the viewer is watching. Viewer preferences dictate interruption rules as to which phone numbers and email originators generate a notice only, which phone calls and emails interrupt viewing and under what circumstances. For example, a viewer may want to answer a call from his girlfriend unless he is watching soccer. In this case, the call would be unobtrusively noticed or ignored without a pause during a soccer match but would pause viewing otherwise.

Processing in the present invention proceeds depending on the event priority. Based on the event priority, a preferred embodiment of the present invention will issue one of four categories of event notification, as shown in FIG. 4. For an event originated from an external input 108, for example, the expiration of an oven timer, the user 104 will be presented with an appropriate response scenario based on the viewer preferences and interruption rules.

Of primary interest is the automatic pause scenario of block 120. Pausing is the primary processing path, that is, that path which impacts the viewer the most. This first category of notification is illustrated as block 120 in FIG. 4. When an event with a high relative priority occurs, the present invention, based on a balance between the nature of the event and the user's preferences or interests in the incoming event, the present invention will automatically pause the current broadcast and render the event to the viewer 120. The viewer responds to the event via a voice or digital command from a remote control, or by simply walking out of, or back into the room and being sensed by a motion sensor or camera/image recognition system provided by the present invention. Motion sensors (not shown) and cameras are well known in the art and are provided in an alternative embodiment of the present invention as an option in the STB.

For example, given a very high event priority, the present invention will automatically pause the live broadcast when an oven timer times out, so that the viewer can run to the oven, take the roast out and then resume viewing the recorded portion of the live broadcast in time-shifted mode upon returning without missing anything. That is, the recorded portion of the live program, recorded during the pause, is played back after the automatic pause to enable the viewer time to respond to the oven time out and resume viewing without missing any part of his program. The recorded program segment that was recorded during the pause, is played back when the viewer returns from the oven and clicks in a resume command with the STB to indicate he or she is now ready to begin watching the rest of the program, at the point where the program was paused. In an alternative embodiment, the viewer's departure and return are also detected with a motion detector, an infrared scanner or with a camera and associated video image recognition system. When the viewer leaves and reenters the room, playback resumes.

As shown in block 122, 124 and 126 the present invention issues less invasive, non-obtrusive notifications for events having a lesser priority than the primary events processed by block 120. Block 126 issues a non-obtrusive event notification that may be audio or visual or both. In any case, the non-obtrusive event notification is superimposed over the uninterrupted current program, be it a prerecorded or live broadcast or an application. It is at the viewer's discretion as to what further action, if any, is taken once the program is paused. The non-obtrusive event notification can simply be ignored by the viewer and will time out and expire, unless its event relative priority is high enough to warrant retrying with additional emphasis. Events that are ignored with a medium-low priority expire. Initially ignored events, with a medium-high priority are first intensified before expiring. Typical visual notification are graphical popups that are surimposed on the video program and/or interactive content of the program. Visual or aural intensification is accomplished in a preferred embodiment by adding audio to a visual notification; adding visual notice to an audio notification; enlarging, brightening, reversing color, or flashing a visual notification;

or increasing volume for an audio notification, until the event is acknowledged or times out. Timed-out events either expire or are placed in a pending queue by placing the timed-out event in a retry queue, depending on priority. An event having a medium-high priority is placed in the retry queue while a lower priority event expires and is not placed in the retry queue.

In a preferred embodiment, the stored program and subsequent time delayed broadcast can be replayed at an accelerated pace to catch up to view live broadcast and eliminate any time delay between the viewer and the live broadcast. For example, if a viewer is watching world cup soccer and has to take a five-minute break to service an oven timer timeout notification, the viewer may resume watching the soccer game when he returns. By selecting accelerated playback, that portion of the live broadcast that occurred during the viewer's absence is played back at an accelerated pace to make up the five-minute lag between the viewer and the live broadcast. Thus, the five-minute segment of recorded live broadcast can be played back in, for example, two and one-half minutes. That portion of the live or prerecorded broadcast that occurs during the accelerated playback is also stored for accelerated playback until the accelerated playback catches up to the live broadcast.

In an alternative embodiment, the present invention calculates the optimal acceleration rate by sensing the duration of the pause, the remaining duration of the program and calculating an optimal acceleration rate. The duration of the program is determined from the start time and duration information retrieved from the System Information. The elapsed time is the difference between the start time and the current time. The remaining duration is calculated by subtracting the elapsed time from the total program duration. To determine the optimal amount of acceleration required to catch up to live broadcast, the present invention assumes a default maximum acceleration value of 100%. This maximum acceleration value is programmable and can be adjusted by the viewer. Applying this value, after a five-minute pause, if there are more two and one-half minutes to five minutes remaining in the program, the present invention would apply the maximum playback acceleration rate to catch up to live programming in two and one-half minutes. Accelerated playback enables catching up playback to a live or real-time broadcast which accomplishes at least two objectives: (1) it enables the viewer to see the live ending of a live program without delay (for example the last five minutes of the super bowl football game) and (2) it enables a prerecorded program to end on time so that it does not overlap a subsequent program. The playback automatically accelerates unless deselected by the viewer. If there are more than ten minutes remaining the program a slower acceleration rate of 50% is applied. If there are more than thirty minutes remaining in the program, a still slower acceleration rate of 25% is used. Different playback acceleration rates can be applied to different types of programming. For example, faster rates for live programming, where catching up quickly to see live action is imperative, and slower rates for prerecorded programming where the program just needs to end on time.

As shown in block 128, the user response to a Non-obtrusive Notification 126 is preferably generated from a viewer's remote control button, from a voice command, or from a time out parameter. When a time out occurs, the event notification terminates, placed in a pending status and the present invention may retry the notification later. The remaining duration of the broadcast determines how often and at what time retries will be attempted. If five minutes are left, a single retry will occur at the three minutes remaining mark. If thirty minutes are left in the program, three retries, one every five minutes will be attempted. The amount of retries and time or retry attempts is programmable and depends on message type, priority and interruption rules. After the user response the present invention proceeds to either block 130 Do Nothing, block 132 Do Something or block 134 Go to New Action.

In block 130 Do Nothing, the viewer does not respond, the event is simply placed in a pending queue and no further action is taken until timeouts occur and pended events are reevaluated to retry or expire. The viewer does nothing and programming continues uninterrupted. Certain medium-low priority events are allowed to expire after a programmable number of retries. Certain medium-high priority events are retried until acknowledged or a second retry time out value is exceeded, upon which occurrence the event notification expires. In block 132 the preferred embodiment of the present invention initiates a programmable response. In this case, playback of recorded programming broadcast, recorded during the pause resumes after the viewer acknowledges the event notification. The viewer can choose to resume viewing in real time and skip playback of recorded programming recorded during the pause. In block 134 the preferred embodiment goes to a new action. This new action might be to send a hardware command to a household device, such as turning off the oven or turning on a burglar alarm. In this case, playback of programming recorded during the pause, resumes after the viewer acknowledges the event notification.

All incoming events requesting resources are processed by process Check Resource Availability 118. The viewer priority and preferences 116 are factored into the event relative priority, so that an event identification indicating an urgent notice from his stockbroker to sell immediately, interrupts at a high priority and a reminder from the dentist does not, based on the preferences and priorities the viewer chooses. In that case, the dentist remainder popup would be interrupted by the stock broker alert, while if the stock broker alert was displayed first, the dentist remainder would wait (put in a pending event queue) until the user is done with the stock broker alert. Viewers can assign special codes to indicate urgency, which can given to an email originator who can use the code to get special attention or handling for a message. An urgency code can be inserted into an incoming event, for example, an email subject line or message header encapsulating an email and decoded for special treatment by the present invention. In a preferred embodiment, a profile of the viewer's choices is collected and utilized to assign priority to events. In an alternative embodiment, a neural network can be utilized to learn a viewer profile and generate appropriate event priorities based on the incoming event priority and the viewer profile. Event priorities 124 that require no immediate feed back and are essentially ignored by the viewer 104 as shown in block 124. Other outputs 122 can be programmed for particular event types, for example, an oven time out can send a signal to the oven to turn it off. The user may or may not be notified when such operation occurs.

The above described method and apparatus also apply to the playback of a recording (e.g. from a video cassette recorder (VCR) or a personal video recorder (PVR) which may comprise audio, video as well as interactive data. Similarly to previous embodiments, the playback may be automatically interrupted (i.e. paused) by external events. The above described method and apparatus may be implemented in a computer program product having computer codes that perform the various steps of the methods. The computer codes are preferably stored in a computer readable storage medium, such as CD-ROM, zip disk, floppy disk, tape, flash memory, system memory, or hard drive. Alternatively the signal could be on a media such as data signal embedded in a carrier wave.

Although the present invention has been described in accordance with the embodiments shown, one of ordinary skill in the art will readily recognize that there could be variations made to the embodiment without departing from the scope of the present invention. Accordingly, it is intended that all matter contained in the above description and shown in the accompanying drawings shall be interpreted as illustrative and not in a limiting sense.

What is claimed is:

1. A method for automatically pausing the display of content and processing events at a client device, said content being provided by a server at a head-end operator, broadcaster, web content provider or network operator, said method comprising:
    displaying content on a client device;
    detecting an event at the client device during the display of the content;
    assigning a priority to the detected event, said priority being selected from a plurality of priorities which may be assigned to an event;
    pausing display of the content and recording the content while the display is paused, wherein said pausing is automatically performed in response to determining said priority is relatively high;
    continuing display of the content, in response to determining said priority is relatively low;
    providing a viewer discernable notification of the detected event; and
    removing the viewer discernable notification of the detected event, in response to detecting said priority is relatively low and a timeout for acknowledgement of said event has expired.

2. The method of claim 1, wherein said priority is based at least in part on either (1) the subject matter of the content currently being displayed, or (2) a viewer profile.

3. The method of claim 1 further comprising:
    resuming display of the paused content, in response to detecting an acknowledgement of said event from the viewer.

4. The method of claim 3 wherein resuming display of the paused content comprises replaying the recorded content at an accelerated rate until the playback of recorded content synchronizes with the provided content so that the display switches back to display of the provided content.

5. The method of claim 4 wherein the accelerated playback rate is automatically determined based on the duration of the pause and the duration of the content remaining so that the content display ends at the same time it would have ended without a paused interruption in the display.

6. The method of claim 1 wherein the step of assigning a priority further comprises either:
    identifying an originator of the event, identifying a viewer preference for the originator, and assigning a priority based on the viewer preference with regard to the originator; or
    identifying an event type, identifying a viewer preference for the event type, and assigning a priority based on the viewer preference with regard to the event type.

7. The method of claim 6, wherein the step of assigning a priority further comprises applying an interruption rule based on the current content displayed.

8. The method of claim 1, further comprising:
    placing data corresponding to the detected event in a pending queue responsive to said timeout.

9. The method of claim 8, further comprising utilizing the data stored in the pending queue to retry the detected event, wherein said retrying comprising providing an additional viewer discernable notification of the detected event.

10. The method of claim 9, wherein said viewer discernable notification comprises an audible and/or visible notification; and wherein said retrying further comprises providing said audible and/or visible notification with an increased intensity.

11. An apparatus for automatically pausing the display of content provided by a server at a head-end operator, broadcaster, web content provider or network operator and processing incoming events, said apparatus comprising:
    a display device for displaying content;
    an interface for receiving an event during the display of the content;
    a storage device for storing received content; and
    a processing unit configured to:
        assign a priority to the received event, said priority being selected from a plurality of priorities which may be assigned to an event;
        automatically pause display of the content and record the content on the storage device while the display is paused, in response to determining said priority is relatively high with respect to said plurality of priorities
        continue display of the content, in response to determining said priority is relatively low with respect to said plurality of priorities;
    provide a viewer discernable notification of the event; and
        remove the viewer discernable notification of the detected event, in response to detecting said priority is relatively low and a timeout for acknowledgement of said event has expired.

12. The apparatus of claim 11 wherein said processing unit is configured to assign said priority based at least in part on either (1) the subject matter of the content currently being displayed, or (2) a viewer profile.

13. The apparatus of claim 12 wherein said processing unit is further configured to resume display of the paused content which is recorded on the storage device, in response to detecting an acknowledgement of said event from the viewer.

14. The apparatus of claim 13 wherein the processing unit is further configured to replay the recorded content at an accelerated rate until the playback of the recorded content synchronizes with the provided content so that the display switches back to display of the provided content.

15. The apparatus of claim 14 further wherein said processing unit is configured to automatically determine the accelerated playback rate based in part upon the duration of the pause and the duration of the display content remaining.

16. The apparatus of claim 15 further comprising:
a data structure for identifying an originator of the event and a viewer preference for the originator; and
a processor for examining the data structure identifying originator of the event, the viewer preference for the originator and assigning a priority based on the viewer preference with regard to the originator.

17. The apparatus of claim 11, wherein said processing unit is further configured to place the event in a pending queue responsive to the timeout.

18. The apparatus of claim 17, wherein the processing unit is configured to retry the event in the pending queue by providing an additional viewer discernable notification of the event.

19. The apparatus of claim 18, wherein said viewer discernable notification comprises an audible and/or visible notification; and wherein said retrying further comprises providing said audible and/or visible notification with an increased intensity.

20. A computer readable storage medium comprising instructions which when executed are operable to:
display content provided by a server on a client device;
detect an event at the client device during the display of the content;
assign a priority to the detected event, said priority being selected from a plurality of priorities which may be assigned to an event;
pause display of the content and record the content while the display is paused, wherein said pausing is automatically performed in response to determining said priority is relatively high;
continue display of the content, in response to determining said priority is relatively low;
provide a viewer discernable notification of the detected event; and
remove the viewer discernable notification of the detected event, in response to detecting said priority is relatively low and a timeout for acknowledgement of said event has expired.

* * * * *